United States Patent
Xu et al.

(10) Patent No.: US 11,003,969 B2
(45) Date of Patent: May 11, 2021

(54) INFORMATION PROCESSING METHOD, DEVICE AND STORAGE MEDIUM

(71) Applicant: TENCENT TECHNOLOGY (SHENZHEN) COMPANY LTD, Shenzhen (CN)

(72) Inventors: Dianping Xu, Guangdong (CN); Yugeng Lin, Guangdong (CN); Chen Ran, Guangdong (CN); Jingjing Li, Guangdong (CN); Hao Chen, Guangdong (CN); Hongyang Wang, Guangdong (CN); Leteng Weng, Guangdong (CN); Xiaobin Fang, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/515,188

(22) Filed: Jul. 18, 2019

(65) Prior Publication Data
US 2019/0340477 A1   Nov. 7, 2019

Related U.S. Application Data

(63) Continuation of application No. PCT/CN2018/079110, filed on Mar. 15, 2018.

(30) Foreign Application Priority Data

Mar. 31, 2017 (CN) .......................... 201720339323.2

(51) Int. Cl.
*G06K 19/06* (2006.01)

(52) U.S. Cl.
CPC . *G06K 19/06103* (2013.01); *G06K 19/06037* (2013.01)

(58) Field of Classification Search
CPC ....... G06K 19/06037; G06K 19/06103; G06K 19/06168
See application file for complete search history.

(56) References Cited

U.S. PATENT DOCUMENTS 5,946,103 A * 8/1999 Curry .................... G06T 1/0028
235/494
5,949,055 A * 9/1999 Fleet .................... G06T 1/0028
235/454

(Continued)

FOREIGN PATENT DOCUMENTS

CN   101430768 A   5/2009
CN   101908155 A   12/2010

(Continued)

OTHER PUBLICATIONS

Chinese Office Action for 201720339323.2 dated Sep. 26, 2017.
(Continued)

*Primary Examiner* — Thien M Le
(74) *Attorney, Agent, or Firm* — Sughrue Mion, PLLC (57) ABSTRACT

A method of an information processing device is provided. The method includes: dividing, by the at least one processor, a predetermined region used for generating a two-dimensional code into an image region and an encoding region that does not overlap the image region; setting, by the at least one processor, a first image in the image region; and setting, by the at least one processor, at least one code element used for storing data information in the encoding region.

20 Claims, 9 Drawing Sheets

(56) References Cited

U.S. PATENT DOCUMENTS

| | | | | |
|---|---|---|---|---|
| 6,081,345 | A * | 6/2000 | Curry | G06K 1/121 |
| | | | | 235/494 |
| 6,092,732 | A * | 7/2000 | Curry | G06K 19/06018 |
| | | | | 235/460 |
| 7,785,098 | B1 * | 8/2010 | Appleby | G21K 1/02 |
| | | | | 425/470 |
| 9,206,309 | B2 * | 12/2015 | Appleby | B22C 9/04 |
| 2010/0246984 | A1 * | 9/2010 | Cheong | G06T 1/005 |
| | | | | 382/233 |
| 2013/0021364 | A1 * | 1/2013 | Azuma | G06K 19/0614 |
| | | | | 345/589 |
| 2013/0026241 | A1 * | 1/2013 | Sakahashi | G06K 19/06037 |
| | | | | 235/494 |
| 2014/0263662 | A1 | 9/2014 | Anagnostou et al. | |
| 2015/0221077 | A1 * | 8/2015 | Kawabata | G06T 7/337 |
| | | | | 382/141 |
| 2015/0324946 | A1 * | 11/2015 | Arce | G06K 19/06103 |
| | | | | 382/251 |
| 2015/0332136 | A1 * | 11/2015 | Nosaka | G06K 19/0614 |
| | | | | 235/494 |
| 2016/0189383 | A1 * | 6/2016 | Wang | G06K 9/3216 |
| | | | | 348/135 |

FOREIGN PATENT DOCUMENTS

| | | |
|---|---|---|
| CN | 101968877 A | 2/2011 |
| CN | 102737263 A | 10/2012 |
| CN | 103400175 A | 11/2013 |
| CN | 103632181 A | 3/2014 |
| CN | 103699865 A | 4/2014 |
| CN | 104778440 A | 7/2015 |
| CN | 104781834 A | 7/2015 |
| CN | 104851117 A | 8/2015 |
| CN | 104966115 A | 10/2015 |
| CN | 106447001 A | 2/2017 |
| CN | 106951812 A | 7/2017 |
| CN | 207051946 U | 2/2018 |
| JP | 2000-337853 A | 12/2000 |
| TW | I509528 | 11/2015 |

OTHER PUBLICATIONS

International Search Report for PCT/CN2018/079110 dated Jun. 14, 2018 [PCT ISA/210].

Office Action issued from the Taiwanese Patent Office dated Oct. 29, 2020 for Taiwanese Application No. 107128869.

* cited by examiner

INFORMATION PROCESSING METHOD, DEVICE AND STORAGE MEDIUM

CROSS-REFERENCE TO RELATED APPLICATIONS

This application is a continuation of International Patent Application No. PCT/CN2018/079110 filed on Mar. 15, 2018, which claims priority to Chinese Patent Application No. 201720339323.2, entitled "TWO-DIMENSIONAL CODE AND PRINT" filed on Mar. 31, 2017, the disclosures of which are incorporated by reference in their entireties.

BACKGROUND

Field

Methods and apparatuses consistent with embodiments relate to information processing, and in particular, to an information processing method and device, and a storage medium.

Related Art

Recently, a widely used encoding mode on a mobile device is a two-dimensional code, which records information about a data symbol by using specific black and white graphics that are distributed in a plane (that is, in a two-dimensional direction) based on a particular rule. Compared with a conventional one-dimensional bar code, the two-dimensional code can store more information, and can also represent more types of data.

SUMMARY

One or more embodiments provide an information processing method and device, and a storage medium, to improve identification efficiency of a two-dimensional code.

According to an aspect of an embodiment, there is provided a method performed by at least one processor of an information processing device. The method includes: dividing, by the at least one processor, a predetermined region used for generating a two-dimensional code into an image region and an encoding region that does not overlap the image region; setting, by the at least one processor, a first image in the image region; and setting, by the at least one processor, at least one code element used for storing data information in the encoding region.

According to an aspect of an embodiment, there is provided a device including: at least one memory configured to store computer program code; and at least one processor configured to access the at least one memory and operate as instructed by the computer program code. The computer program code includes: dividing code configured to cause the at least one processor to divide a predetermined region used for generating a two-dimensional code into an image region and an encoding region that does not overlap the image region; first setting code configured to cause the at least one processor to set a first image in the image region; and second setting code configured to cause the at least one processor to set at least one code element used for storing data information in the encoding region.

According to an aspect of an embodiment, there is provided one or more non-transitory computer readable storage medium storing computer readable instructions, the computer readable instructions, when executed by one or more processors of a device, cause the device to: divide a predetermined region used for generating a two-dimensional code into an image region and an encoding region that does not overlap the image region; set a first image in the image region; and set at least one code element used for storing data information in the encoding region.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

The following clearly and completely describes the technical solutions in the embodiments of this application with reference to the accompanying drawings. The embodiments described herein are merely some of the embodiments of this application. All other embodiments obtained by a person of ordinary skill in the art based on the embodiments of this application without creative efforts shall fall within the protection scope of this application.

Figure 1:
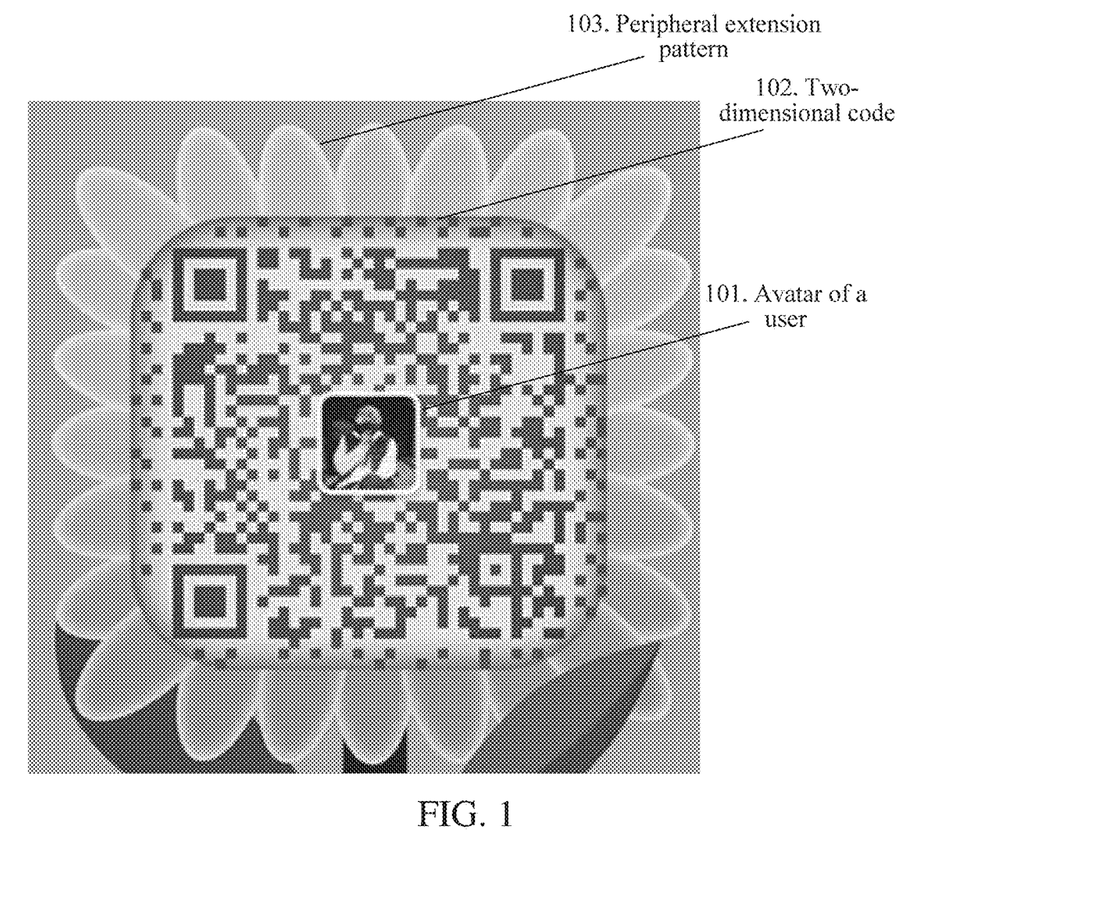
FIG. 1 is an exemplary diagram of a two-dimensional code according to an embodiment.

A user may personalize a two-dimensional code by inserting an image into a two-dimensional code. The image may be, for example, a customized avatar of the user or a logo. FIG. 1 is an exemplary diagram of a two-dimensional code according to an embodiment. As shown in FIG. 1, an avatar 101 of a user is inserted into an intermediate region of a two-dimensional code 102, and some extension patterns 103 are added to the periphery of the two-dimensional code 102.

According to this embodiment, the two-dimensional code is set in a two-dimensional rectangular region, and is formed by many small basic units spliced together. The small basic unit is referred to as a code element of the two-dimensional code. The code element is a basic unit constituting the two-dimensional code, and the two-dimensional code is usually formed by splicing (or aggregating) many code elements.

A shape of the code element may be a square, and the code element is colored in black and white. However, it should be noted that this embodiment is not limited thereto. For example, the shape of the code element may be a square, a circle, a rounded square, or a combination of the foregoing shapes. A color of the code element may be, for example, a combination of a black color and a white color. The black color represents binary 1, and the white color represents binary 0. Alternatively, the color of the code element may be, for example, a combination of a red color and a white color. The red color represents binary 1, and the white color represents binary 0. Certainly, the two-dimensional code may further use another color combination, provided that the color combination can be identified and distinguished by a machine.

The two-dimensional code may correspond to a plurality of versions, and different versions of two-dimensional codes correspond to different quantities of code elements. Therefore, information capacities of the different versions of two-dimensional codes are also different. For example, a two-dimensional code in version 1 includes 21×21 code elements, a two-dimensional code in version 2 includes 25×25 code elements, and the rest may be deduced by analogy; a two-dimensional code in version 40 includes 177×177 code elements. A higher version indicates a larger quantity of code elements included in a two-dimensional code, and correspondingly, the two-dimensional code can contain more information.

Figure 2:
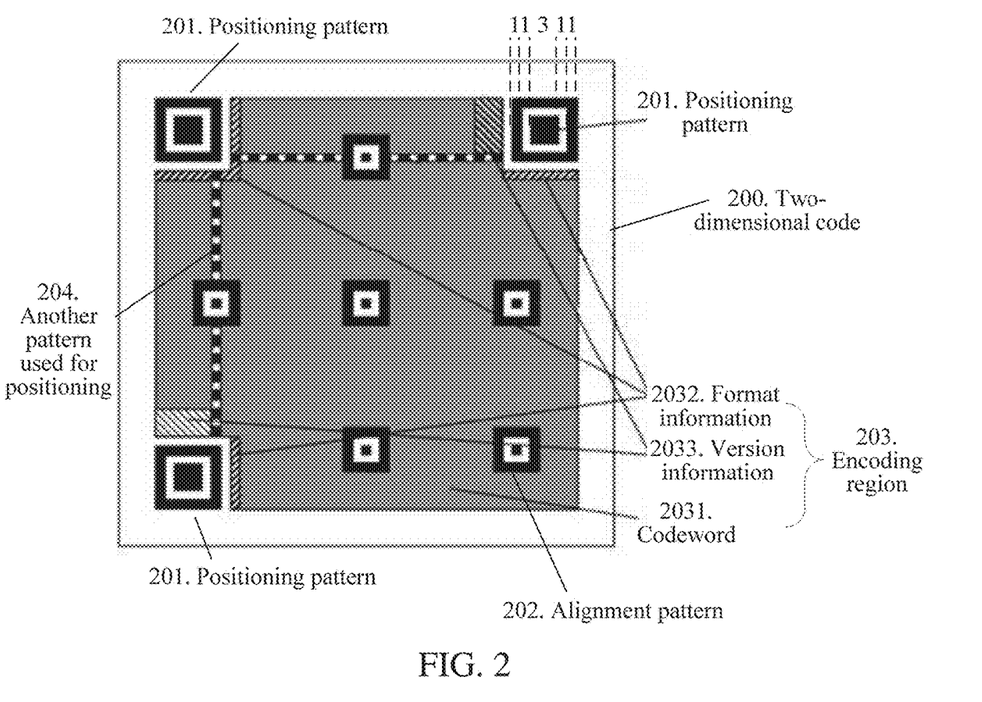
FIG. 2 is a schematic diagram of an inner structure of a two-dimensional code according to an embodiment.

FIG. 2 is a schematic diagram of an inner structure of a two-dimensional code according to an embodiment. Referring to FIG. 2, the two-dimensional code 200 includes a positioning pattern 201 (which may also be referred to as a position detection pattern). The positioning pattern 201 may be used for determining a direction of the two-dimensional code 200. In FIG. 2, the two-dimensional code 200 includes three positioning patterns 201, which are distributed on an upper left corner, an upper right corner, and a lower left corner of the two-dimensional code 200 respectively. The positioning pattern 201 is a pattern having a fixed ratio. As shown in FIG. 2, the positioning pattern 201 is a black and white homocentric square-shaped pattern, and a fixed ratio of the black and white code elements along a horizontal direction is 1:1:3:1:1. In a process of scanning the two-dimensional code 200, the positioning pattern 201 of the two-dimensional code 200 is first searched for based on the fixed ratio, thereby determining the direction of the two-dimensional code 200.

Further, the two-dimensional code 200 may include one or more alignment patterns 202, and the alignment pattern may also be referred to as an assistant positioning pattern. During actual application, not all versions of two-dimensional codes need to be provided with the alignment pattern. For example, an alignment pattern is set for the two-dimensional code in version 2 or a higher version. The alignment pattern is mainly used for determining whether the two-dimensional code is folded or twisted and aligning the two-dimensional code when the two-dimensional code is folded or twisted.

Further, the two-dimensional code 200 includes an encoding region 203, and the encoding region 203 is mainly used for storing specification information and a codeword 2031 of the two-dimensional code 200. The specification information may include at least one of format information 2032 and version information 2033 that are shown in FIG. 2. A type of the specification information mainly depends on a version of a two-dimensional code, and different versions of two-dimensional codes may be configured with different types of specification information. Using an example in which the specification information includes format information and version information, the format information 2032 and the version information 2033 are usually stored in a rectangular region as shown in FIG. 2.

The version information 2033 of the two-dimensional code is used for indicating a size of the two-dimensional code 200 (or a quantity of code elements of the two-dimensional code 200). The format information 2032 of the two-dimensional code is used for storing some formatted data, for example, an error correction level and mask information of the two-dimensional code 200. For example, the error correction level of the two-dimensional code includes four levels, which are L, M, Q, and H respectively. Table 1 gives proportions of error codewords that can be corrected in two-dimensional codes with different error correction levels. With the error correction function of the two-dimensional code, the two-dimensional code can still be identified after an image is inserted into the rectangular region of the two-dimensional code.

TABLE 1

| | |
|---|---|
| L | Capable of correcting 7% of error codewords |
| M | Capable of correcting 15% of error codewords |
| Q | Capable of correcting 25% of error codewords |
| H | Capable of correcting 30% of error codewords |

Still referring to FIG. 2, a code element in a grey region in FIG. 2 is used for recording or storing the codeword 2031. The codeword 2031 is a bit sequence obtained after data encoding is performed on original data, and the codeword may include a data code, and may further include an error correction code. A used encoding mode may be digital encoding, character encoding, or the like. The error correction code may be obtained through calculation based on a selected error correction level and by using an algorithm such as a Reed Solomon error correction algorithm.

In addition, the two-dimensional code structure shown in FIG. 2 further includes another pattern 204 used for positioning.

Figure 3:
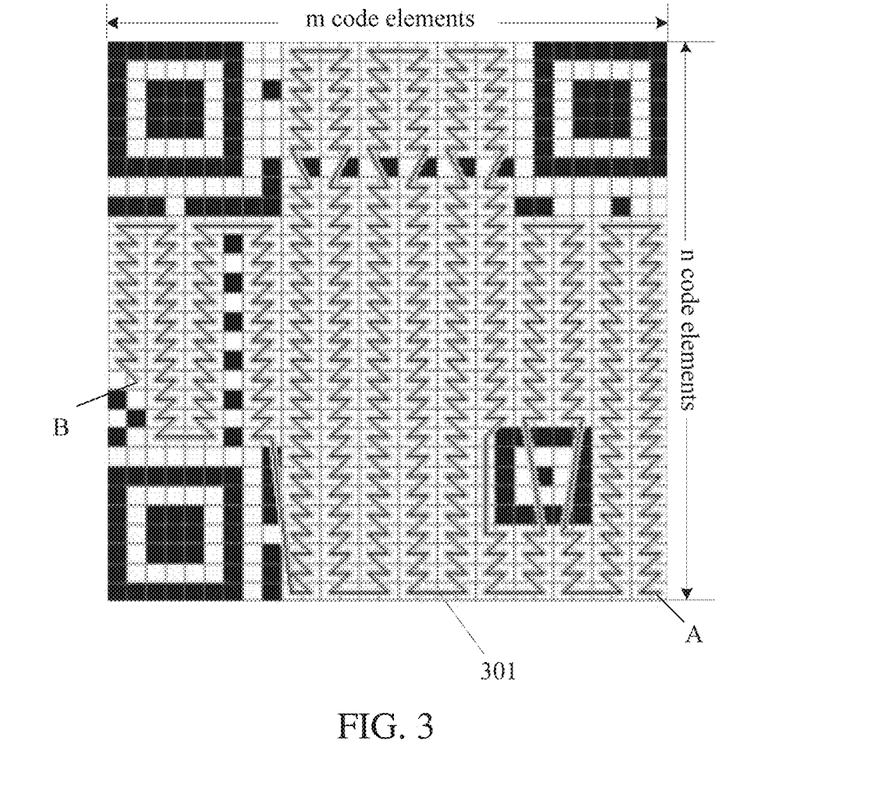
FIG. 3 is a schematic diagram of a filling path of an encoding region of a two-dimensional code according to an embodiment.

According to this embodiment, after the version information, the format information, and the codeword of the two-dimensional code are determined, color filling may be performed on the code elements in the encoding region based on a preset rule. FIG. 3 depicts an example of a filling path of code elements used for recording codewords in an encoding region. Referring to FIG. 3, after a codeword is obtained, point A shown in FIG. 3 may be used as a start point, point B is used as an end point, and color filling is performed on the code elements in the encoding region along a filling path 301 shown by a fold line in FIG. 3. If a code element in a non-encoding region such as an alignment pattern is encountered on the way, the code element can be bypassed or skipped.

It should be understood that, the filling path 301 shown in FIG. 3 is only an example. In practice, any form of filling path may be set, provided that an encoder side and a decoder side pre-negotiate with each other. Further, a preset mask pattern may further be used for masking a filled two-dimensional code pattern, so that color distribution of the eventually presented two-dimensional code pattern is more uniform.

As shown in FIG. 3, the two-dimensional code is located in a rectangular region, and the rectangular region includes m×n code elements. Values of m and n are related to a version of the two-dimensional code. For example, in the two-dimensional code in version 1, m=n=−21.

Before identification is performed on the two-dimensional code, a positioning operation and a normalization operation need to be performed on the two-dimensional code. The normalization operation means that the two-dimensional code is mapped to be a standard rectangular image, so that each code element of the two-dimensional code corresponds to one pixel in the rectangular image. In a process of identifying the two-dimensional code, a value of one code element of the two-dimensional code can be determined provided that a color of one pixel in the rectangular image is identified.

In addition, in the embodiment shown in FIG. 2, the two-dimensional code includes a positioning pattern and an alignment pattern that are formed by aggregating code elements having fixed shapes and ratios. Before the two-dimensional code is identified, the two-dimensional code further needs to be aligned based on the positioning pattern and the alignment pattern. Specifically, the positioning pattern and the alignment pattern may be searched for in a two-dimensional code region. Then, based on a positional relationship between the positioning pattern as well as the alignment pattern and vertexes (usually including four vertexes) used for aligning the two-dimensional code, positions of the vertexes used for aligning the two-dimensional code are determined (for example, these vertexes may be center points of the positioning pattern and the alignment pattern). Next, the two-dimensional code may be aligned by using these vertexes. For example, perspective transformation may be performed on a two-dimensional code matrix by using these vertexes, and the two-dimensional code is transformed to a correct orientation.

According to the foregoing embodiment, because the image inserted into the two-dimensional code may block some of the code elements of the two-dimensional code, in the process of identifying the two-dimensional code, error correction processing may be performed on a blocked part by using an error correction function of the two-dimensional code.

To avoid damaging integrity of the two-dimensional code and further improve identification efficiency of the two-dimensional code, other embodiments are provided.

Figure 4:
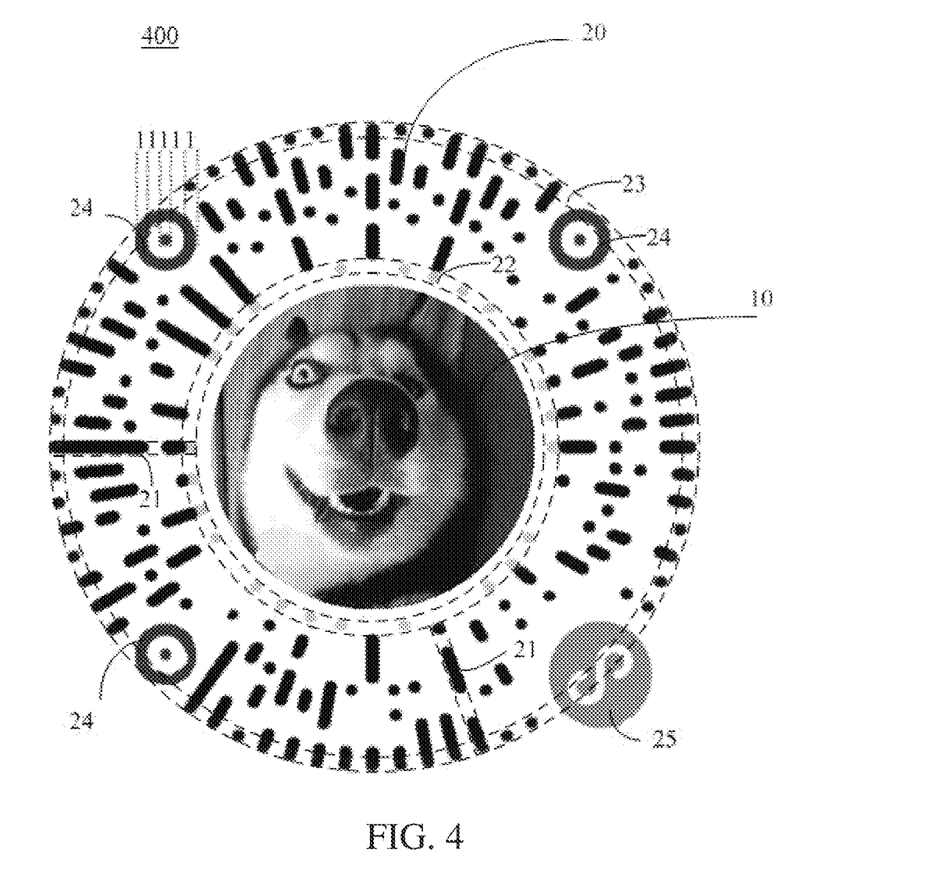
FIG. 4 is an exemplary diagram of a two-dimensional code according to another embodiment.

FIG. 4 is an exemplary diagram of a two-dimensional code according to another embodiment. As shown in FIG. 4, a two-dimensional code 400 includes an image region 10. A first image is set in the image region 10. A type of the first image is not specifically limited in this embodiment, and a user may set various types of images according to actual requirements. Optionally, in some embodiments, the first image may be an avatar of a user of the two-dimensional code or a logo.

Further, the two-dimensional code 400 includes an encoding region 20. The encoding region 20 includes each code element used for recording or storing a codeword. The codeword includes a data code, and in some embodiments, the codeword may further include an error correction code. In addition, the encoding region 20 and the image region 10 do not overlap with each other. In other words, the encoding region 20 and the image region 10 are isolated from each other. That the encoding region 20 and the image region 10 do not overlap with each other means that the image region 10 is an independent region different from the encoding region 20, and the image region 10 may be specially used for placing an image. In other words, the image placed in the image region 10 does not block any code element in the encoding region of the two-dimensional code.

The two-dimensional code provided in the foregoing embodiment is provided with the image region and the encoding region that do not overlap with each other. Therefore, the image (that is, the first image) inserted into the image region does not block the code element of the two-dimensional code. Therefore, a quantity of codewords that need to be corrected can be reduced, thereby improving identification efficiency of the two-dimensional code. Further, the two-dimensional code provided in the foregoing embodiment does not damage the pattern formed by the code elements in the two-dimensional code, so that the integrity of the two-dimensional code is maintained.

A positional relationship between the image region 10 and the encoding region 20 is not specifically limited in this embodiment. As shown in FIG. 4, in some embodiments, the encoding region 20 may be set around the image region 10. In some other embodiments, the encoding region 20 and the image region 10 may be set in parallel. For example, the entire two-dimensional code occupies a rectangular region, the image region 10 occupies an upper part of the rectangular region, and the encoding region 20 occupies a lower part of the rectangular region. Actually, positions of the image region 10 and the encoding region 20 may be further arranged in any other manner, provided that the two are both located inside the entire two-dimensional code region.

It should be understood that a shape of the image region 10 is not specifically limited in this embodiment. Optionally, in some embodiments, the image region 10 may be a circular region. Optionally, in some other embodiments, the image region 10 may further be a rectangular region.

It should be noted that a shape of the first image set in the image region 10 and a position of the first image in the image region 10 are not specifically limited in this embodiment. As shown in FIG. 4, in some embodiments, the image region 10 is a circular region, and the first image is a circular image. In some other embodiments, the image region 10 may be a circular region, and the first image may be a rectangular or square image located inside the image region 10.

Referring to FIG. 4, a remaining region of the two-dimensional code 400 other than the image region 10 may include at least two elongated regions 21 formed by aggregating the code elements of the two-dimensional code, the image region 10 is located in a middle part of a connection line between the at least two elongated regions 21, and the at least two elongated regions 21 are radially arranged around the image region 10.

The code elements of the two-dimensional code are aggregated to form a plurality of elongated regions, and the plurality of elongated regions is radially arranged. Therefore, there is a blank region between elongated regions. A user may set some other graphics or a text in the blank region according to actual requirements, to increase the amount of information that can be provided by the two-dimensional code to the user. In addition, the overall radial two-dimensional code is more beautiful.

In the foregoing embodiment, the at least two elongated regions 21 are radially arranged around the image region 10. It should be noted that the two-dimensional code may not include the image region 10, and the at least two elongated regions 21 are directly radially arranged. For example, the at least two elongated regions 21 may be radially arranged around a point or a blank region in the two-dimensional code.

It should be noted that, the elongated region 21 in this application is not required to be a rectangular elongated region. Actually, the region 21 only needs to be roughly elongated. For example, the elongated region 21 may be a regular rectangular region, or may be an elongated region of a blade shape, or may further be an elongated region of any other shape.

Figure 5:
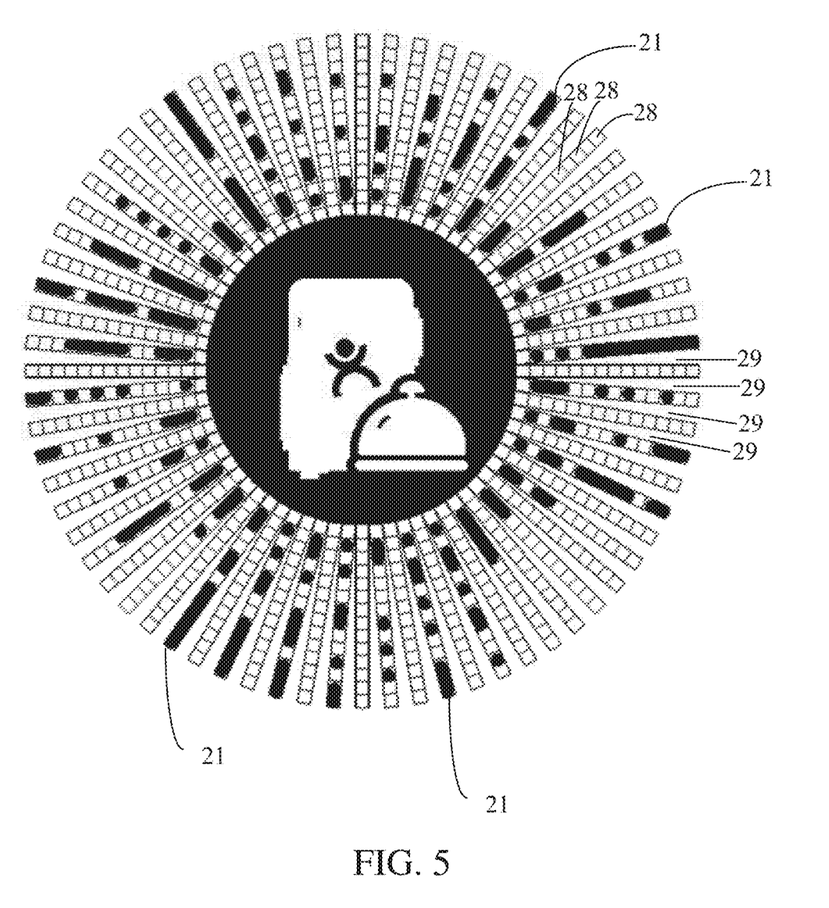
FIG. 5 is an exemplary diagram of an arrangement form of code elements of a two-dimensional code according to another embodiment.

FIG. 5 is an exemplary diagram of an arrangement form of code elements of a two-dimensional code according to another embodiment. Referring to FIG. 5, each elongated region 21 may include one or more code elements 28, and each code element is shown by a small grid in FIG. 5.

It should be understood that, a square code element is used as an example for description in FIG. 5. Actually, the code element in this embodiment may be in another shape. For example, the code element may be a circular code element. It should be further understood that a quantity of code elements included in each elongated region 21 is not specifically limited in this embodiment. The quantity of code elements included in each elongated region in FIG. 5 is only an example for description. In addition, quantities of code elements included in different elongated regions 21 may be the same or different.

It can be learned from FIG. 5 that a blank region 29 is set between different elongated regions 21. The blank region 29 does not include a code element and does not participate in a process of identifying the two-dimensional code. It should be noted that the blank region only means that the region does not include a code element, that is, the region does not include data information participating in identification of the two-dimensional code, and does not mean that the region is in a white color. Actually, the region may be in a white color, or may set to be in any other color. Another graphic or text may be even added, to increase the amount of information that can be provided by the two-dimensional code.

In the embodiments provided in FIG. 4 and FIG. 5, the two-dimensional code may include the image region and the encoding region that do not overlap with each other, and the code elements in the encoding region may be arranged in any shape or pattern. For example, the code elements are arranged in a radial pattern shown in FIG. 5. In addition, the code elements may, alternatively be arranged in one or more annular patterns around the image region. During identification of this type of two-dimensional code, positioning and alignment may be first performed on the two-dimensional code; and then, pixels included in each code element in the encoding region are determined from pixels of the aligned two-dimensional code.

A manner for determining pixels included in each code element in the encoding region is not specifically limited in this embodiment.

Optionally, in an implementation, the encoding region may be divided according to pre-recorded position information, to obtain a region occupied by each code element in the encoding region, where the position information is used for indicating a position of each code element in the encoding region; and pixels that fall within a region occupied by each code element are selected from the pixels of the two-dimensional code, as pixels included in the code element.

FIG. 5 is used as an example. In the process of identifying the two-dimensional code, the encoding region of the two-dimensional code may be divided into many small square blocks similar to those shown in FIG. 5, and each small square block corresponds to a region occupied by one code element. Then, pixels that fall within a region occupied by each code element are used as pixels included in the code element.

Optionally, in another implementation, a pixel included in each code element may be determined by querying a pre-established mapping relationship according to an identifier of each code element in the encoding region, where the mapping relationship is a mapping relationship between an identifier of each code element and positions of pixels, which are included in each code element, in the two-dimensional code.

In this implementation, region division is not required to be performed on the two-dimensional code, and it is only necessary to pre-record the mapping relationship between each code element in the encoding region and pixel positions. An example is used for description. It is assumed that the two-dimensional code includes a code element z, a region occupied by the code element z includes three pixels of the two-dimensional code, and a mapping relationship between the code element z and positions (for example, row and column coordinates of the pixels in the two-dimensional code image) of the three pixels may be pre-recorded. In the process of identifying the two-dimensional code, the three pixels corresponding to the code element z may be directly searched for based on the pre-recorded mapping relationship, and the two-dimensional code is identified based on colors of the three pixels.

In some embodiments, code elements in the remaining region of the two-dimensional code other than the image region 10 may aggregate to form elongated regions having a first length and elongated regions having a second length that are arranged in a staggered manner, where the first length is greater than the second length. In other words, the code elements in the remaining region of the two-dimensional code other than the image region 10 may aggregate to form long elongated regions and short elongated regions that are arranged in a staggered manner.

Figure 6:
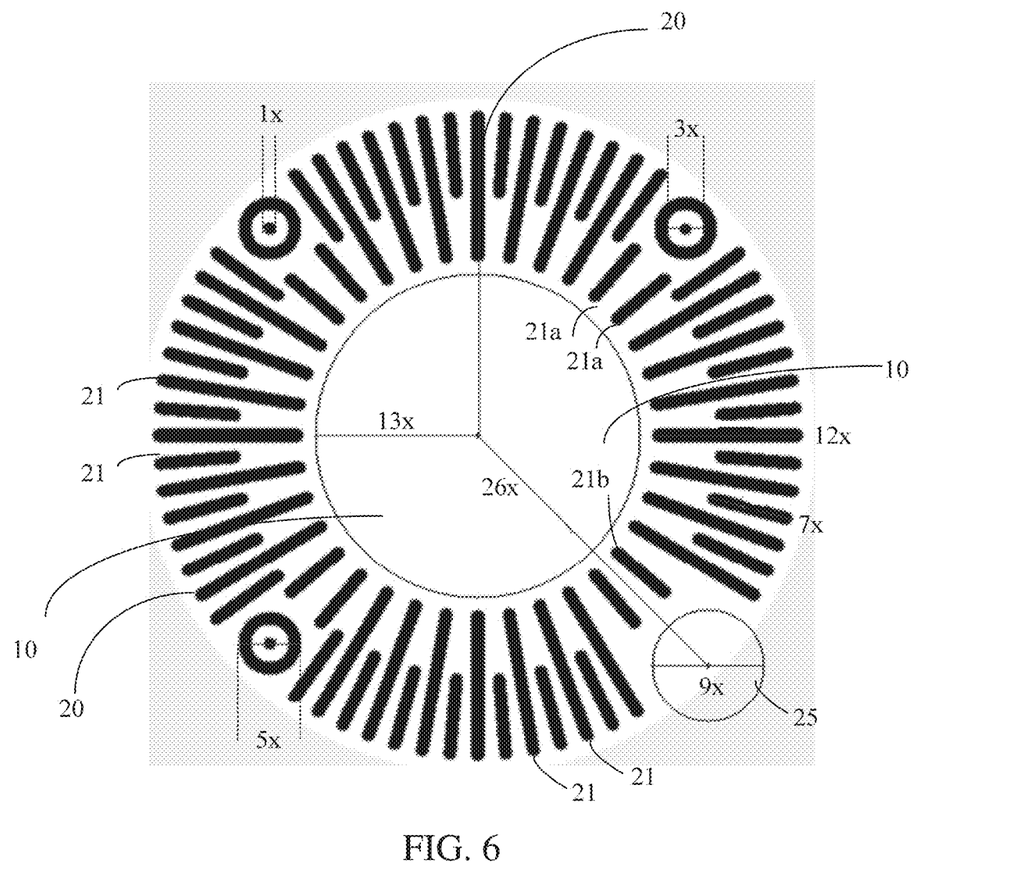
FIG. 6 is an exemplary diagram of parameters of a two-dimensional code according to another embodiment.

FIG. 6 is an exemplary diagram of parameters of a two-dimensional code according to another embodiment. As shown in FIG. 6, a 12 o'clock direction may be used as a start position, and in a clockwise direction, long elongated regions are arranged at intervals of 10 degrees or an integer multiple of 10 degrees, and short elongated regions are arranged at intervals of 5 degrees or an integer multiple of 5 degrees. In accordance with such a principle, a total of 72 long and short elongated regions are arranged in a staggered manner. It should be noted that extending paths of some elongated regions (for example, 21a or 21b in FIG. 6) are provided with other patterns (for example, positioning patterns). In this case, lengths of the elongated regions need to be adaptively adjusted according to shapes of the other patterns, and some elongated regions are even removed.

If only long elongated regions are arranged, there may be more blank regions between long elongated regions. In addition, because the long elongated regions are radially arranged, a blank region between neighboring long elongated regions farther away from the image region is larger. To fully use the blank region between the neighboring long elongated regions, in this embodiment, a short elongated region is inserted between the neighboring long elongated regions. In this way, an overall structure of the two-dimensional code is more compact, and an information capacity of the two-dimensional code is also increased.

It should be understood that FIG. 6 is only an example of an arrangement manner of the elongated regions. Actually, other arrangement manners may also be used. For example, the short elongated regions shown in FIG. 6 may be removed, and only the long elongated regions are reserved. Alternatively, the two-dimensional code provided in this embodiment may include a plurality of versions, and arrangement manners of elongated regions corresponding to two-dimensional codes in different versions are different. For example, the two-dimensional code provided in this embodiment includes version 1 and version 2. The two-dimensional code in version 1 uses a solution in which only long elongated regions are arranged, and the two-dimensional code in version 2 uses a solution in which long elongated regions and short elongated regions are arranged in a staggered manner. When a user requires a relatively high information capacity of the two-dimensional code, the two-dimensional code in version 2 may be used; otherwise, the two-dimensional code in version 1 may be used.

To better present positions and an arrangement manner of the at least two elongated regions 21, in FIG. 6, each of the at least two elongated regions 21 is set to be in a black color. In actual use, code elements in the same elongated region 21 may include black pixels, and may also include white pixels. Therefore, for an actually generated two-dimensional code, the elongated regions 21 may present a visually discontinuous state, as shown in FIG. 4 and FIG. 5.

A shape of the image region 10 is not specifically limited in this embodiment. For example, the shape of the image region 10 may be a rectangle or a circle. In some embodiments, the image region 10 may be a graphic having a geometric center, and extension lines of the at least two elongated regions 21 may pass through the geometric center of the image region 10.

In this embodiment, the at least two elongated regions 21 are radially arranged around the image region 10 as a whole, but a spacing between elongated regions 21 is not specifically limited in this embodiment. For example, the at least two elongated regions 21 may be uniformly arranged around the image region 10. That the at least two elongated regions 21 are uniformly arranged around the image region 10 may mean that an angle between extension lines of two neighboring elongated regions of the at least two elongated regions 21 remains roughly unchanged.

The uniformly arranged elongated regions may enable the overall structure of the two-dimensional code to be more compact and appropriate, and when there is a large quantity of elongated regions densely arranged, a uniform arrangement manner can enable the two-dimensional code to have a higher information capacity.

An example in which the code elements aggregate to form the elongated regions 21 is used for description above. However, this embodiment is not limited thereto, and the code elements in the two-dimensional code may are aggregate to form a pattern in any shape. For example, the code elements in the two-dimensional code may further aggregate to form one or more rings around the image region 10.

It should be noted that the encoding region 20 may be further divided into a plurality of regions, and functions of different regions may be different. A detailed description is made below with reference to specific embodiments.

Optionally, in some embodiments, the encoding region 20 may include a specification region, code elements in the specification region may be used for recording specification information of the two-dimensional code, and the specification information may include at least one of the following information of the two-dimensional code: version information, an error correction level, and mask information (which, for example, may be an identifier of a mask pattern used by the two-dimensional code). Further, in some embodiments, the code elements in the specification region may be arranged around the image region 10.

Using FIG. 4 as an example, a region formed by aggregating code elements that are in the elongated regions and that are closest to the image region 10 may be used as the specification region. Code elements of the specification region are roughly located in, for example, an annular region 22 surrounded by two dashed circles near the image region 10 in FIG. 4.

An example in which the code elements in the specification region are arranged around the image region 10 is used for description above. However, arrangement forms of the specification region and the code elements of the specification region are not limited thereto. Actually, the specification region may be any region in the encoding region 20, and the code elements in the specification region may also be arranged in any pattern or shape. For example, the code elements in the specification region may be located in two elongated regions of the radially arranged elongated regions.

An error correction level setting manner is not specifically limited in this embodiment. For example, the four error correction levels described in Table 1 may be used. Alternatively, new error correction levels may be defined, for example, only three error correction levels, namely, a low error correction level, an intermediate error correction level, and a high error correction level are defined.

The encoding region 20 of the two-dimensional code may further include a codeword region in addition to the specification region. Codewords recorded in the codeword region may include a data code. Further, in some embodiments, the codewords recorded in the codeword region may, further include an error correction code.

Optionally, in some embodiments, the remaining region of the two-dimensional code other than the image region may include an edge region, and code elements in the edge region may form a circular visible pattern. The code elements in the edge region may not store encoding information of the two-dimensional code, and may be specially used for identifying a boundary of the two-dimensional code.

Using FIG. 4 as an example, the edge region is a region formed by aggregating code elements that are in the elongated regions and that are the farthest away from the image region 10. The code elements in the edge region are roughly located in, for example, an annular region 23 surrounded by two dashed circles far away from the image region 10 in FIG. 4, and these code elements roughly form a circle pattern. To keep the circle pattern in a visible state, pixels in these code elements may each be set to be in a black color. In addition, in the circular visible pattern, the code elements in the edge region are required to be connected into a complete closed circle, provided that the code elements in the edge region roughly present a circle as a whole.

Setting the circular visible pattern in the edge region of the two-dimensional code can help a two-dimensional code identification apparatus rapidly position the boundary of the two-dimensional code, thereby improving identification efficiency of the two-dimensional code. Further, setting the circular visible pattern in the edge region of the two-dimensional code can enable the two-dimensional code to be presented as a circle as a whole, so that the two-dimensional code is looks more beautiful.

Optionally, in some embodiments, as shown in FIG. 4, the two-dimensional code may include a plurality of positioning patterns 24, where an outer contour of each positioning pattern 24 may be a circle.

Design of a ratio of the positioning pattern is not specifically limited in this embodiment. For example, a design of 1:1:3:1:1 similar to that in the positioning pattern in the embodiment shown in FIG. 2 may be used. Alternatively, a design of 1:1:1:1:1 as shown in FIG. 4 may be used. The design of 1:1:1:1:1 can reduce a quantity of code elements occupied by the positioning pattern, so that more code elements can be used for recording codeword information, to improve an information capacity of the two-dimensional code.

Optionally, in some embodiments, as shown in FIG. 4, the remaining region of the two-dimensional code other than the image region 10 may be further provided with a target image 25 used for identifying a service type corresponding to the two-dimensional code.

Generally, the two-dimensional code may support many different types of services, for example, a small program, a transaction code, and a personal contact card. The different types of services may be identified by using different logos. For example, when information recorded by the two-dimensional code is a transaction code, the target image 25 may be set as a logo corresponding to the transaction code; and when information recorded by the two-dimensional code is a personal contact card, the target image 25 may be set as a logo corresponding to the personal contact card.

In some embodiments, the target image 25 may be used as an alignment pattern of the two-dimensional code, and is used for aligning the two-dimensional code together with the positioning pattern of the two-dimensional code. For example, contours of both the positioning pattern and the target image may be circular contours, and vertexes used for aligning the two-dimensional code may be center points of the circular contours of the positioning pattern and the target image.

In the foregoing embodiment, the target image is replaced with the alignment pattern. In this way, the target image can provide both a function of identifying a service type of the two-dimensional code and a function of aligning the two-dimensional code. It should be understood that, the target image may be searched for in a plurality of manners. As shown in FIG. 4, a contour of the target image 25 may be set to be a circular contour, and then image edge detection may be performed by using a Sobel operator, so that a position of the target image with the circular contour in a two-dimensional code region is determined.

It can be learned that, in the embodiment shown in FIG. 2, the two-dimensional code is aligned based on the alignment pattern. In the embodiment shown in FIG. 5, the same function is implemented based on the target pattern 25.

It should be noted that the contour of the target image 25 is not specifically limited in this embodiment. For example, the contour of the target image 25 may be a circular contour, a rectangular contour, or a triangular contour.

A size of the two-dimensional code is not specifically limited in this embodiment, two-dimensional codes in a plurality of versions may be set according to actual requirements, and different versions correspond to two-dimensional codes of different sizes. The following gives a selection manner of a specific size or parameters of the two-dimensional code with reference to FIG. 6. It should be noted that, the example in FIG. 6 is only used for helping a person skilled in the art understand this embodiment, but is not intended to limit this embodiment to specific values or a specific scenario illustrated. Apparently, a person skilled in the art can make various equivalent modifications or variations according to the given example in FIG. 6, and such modifications or variations also fall within the scope of this embodiment.

As shown in FIG. 6, using an example in which a diameter of a small round point at the center of the positioning pattern is one times a proportional length (that is, 1×), a diameter of an inner circumference of the positioning pattern may be set to 3×, and a diameter of an outer circumference may be set to 5×.

Further, as shown in FIG. 6, the radially arranged elongated regions described in the foregoing may be formed by long elongated regions and short elongated regions that are arranged in a staggered manner. A length of the long elongated region may be set to 12×, and a length of the short elongated region may be set to 7×.

Specifically, a 12 o'clock direction may be used as a start position; then in a clockwise direction, long elongated regions are arranged at intervals of 10 degrees, and short elongated regions are arranged at intervals of 5 degrees. In accordance with such a principle, 36 long elongated regions and 36 short elongated regions as shown in FIG. 6 are generated. Certainly, only the 36 long elongated regions may be reserved and the 36 short elongated regions may be removed if a requirement on an information capacity of the two-dimensional code is relatively low in some scenarios.

Further, a radius of the image region 10 may be set to 13×. A diameter of a region in which the target image 25 is located may be set to 9×. In addition, as shown in FIG. 6, without considering an impact of the target image 25, the two-dimensional code shown in FIG. 6 is circular as a whole, and a radius of the circle may be set to 26×.

The following gives an example in which the two-dimensional code shown in FIG. 6 is in combination with an actual application solution.

As shown in FIG. 6, the long elongated region has a length of 12×, and can contain a total of 12 code elements. First, one code element in the 12 code elements which is closest to the image region 10 may be allocated to the specification region, to be used for recording specification information of the two-dimensional code. Secondly, one code element in the 12 code elements which is farthest away from the image region 10 may be allocated to the edge region, to be mainly used for forming a circular visible pattern. Therefore, a quantity of code elements that can be used for recording codewords in each long elongated region may be 10.

Similarly, the short elongated region has a length of 7×, and includes 7 code elements in total. One code element in the 7 code elements which is farthest away from the image region 10 may be allocated to the edge region, to be mainly used for forming a circular visible pattern. Therefore, a quantity of code elements that can be used for recording codewords in each short, elongated region may, be 6.

Further, considering that the positioning pattern and the like may occupy some code elements of the two-dimensional code, code elements that can be used for recording codewords in the two-dimensional code are approximately 500, and the encoding region 20 of the two-dimensional code may be formed by aggregating these code elements.

Further, the two-dimensional code shown in FIG. 6 may be provided with error correction levels: L, M, Q, and H. For error correction capabilities of these error correction levels, refer to Table 1.

The two-dimensional code is widely applied to Internet scenarios. Therefore, information stored in the two-dimensional code is generally information of a URL format. Considering that a conventional two-dimensional code does not support URL encoding and supports only ordinary character encoding, a mapping relationship between information capacities of character encoding and URL encoding modes needs to be given, so that a user can select an encoding mode according to actual requirements.

Using an example in which character encoding is 45-ary encoding and URL encoding is 67-ary encoding (that URL encoding is 67-ary encoding is only used as an example for description, and actually, URL encoding may also use another number system herein), a mapping relationship between information capacities of character encoding and URL encoding is shown in Table 2.

TABLE 2

| Total bit quantity | Character encoding capacity (L, M, Q, H) | URL encoding (L, M, Q, H) |
|---|---|---|
| 500 | (68, 55, 41, 32) | (61, 49, 37, 28) |

It can be learned from Table 2 that, for 45-ary character encoding, if the error correction level L is used, a character capacity of 500 bits is generally 68 (which may also be another value and needs to be determined depending on a length of a codeword corresponding to each character), a URL character capacity of URL encoding is 61 according to a conversion relationship between 45-ary and 67-ary (Ln (45)/Ln(67)). For a correspondence between information capacities of character encoding and URL encoding under another error correction level, refer to the foregoing table. Details are not described again herein.

Assuming that the error correction level NI is used, it can be learned by querying Table 2 that a URL character capacity in URL encoding is 49. 49 URL characters may be allocated in accordance with a format shown in Table 3.

TABLE 3

| Version number | Service identifier | Http head mapping region | Service customized region |
|---|---|---|---|
| One URL character | Two URL characters | Six URL characters | 40 URL characters |

Service identifier: The service the identifier occupies two URL characters, and can be used for recording $67^2=4489$ possible service identifiers in total. These service identifiers may be mainly used for distinguishing between service types corresponding to information recorded in the two-dimensional code, and common service types include a personal contact card, a small program, a transaction code, and the like.

Http head mapping region: For the same vendor, the same service usually has the same http head. Therefore, an http head may be mapped to a relatively short identifier, and the identifier may be recorded in the http head mapping region. During encoding, only the identifier corresponding to the http head needs to be encoded, and it is unnecessary to encode the entire http head.

Service customized region: A user may add personalized information to a service customized region, and a service customized region with 40 URL characters can meet a use requirement of the user.

Figure 7:
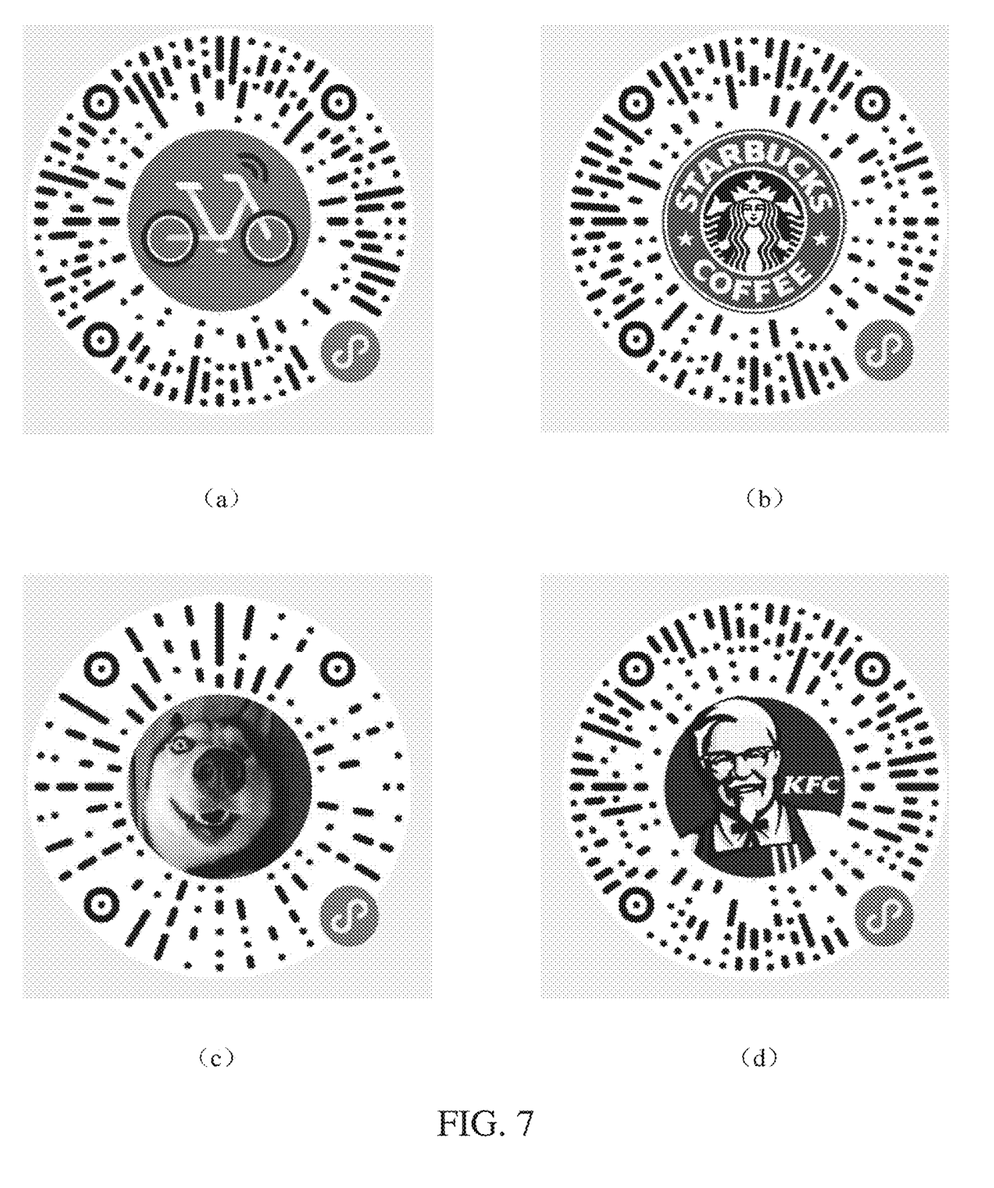
FIG. 7 is an exemplary diagram of a two-dimensional code according to still another embodiment.

FIG. 7 shows a two-dimensional code according to still another embodiment, including four two-dimensional code examples. Similar to the two-dimensional code according to the embodiment in FIG. 6, the examples each include an image region and an encoding region that do not overlap with each other. In the embodiment shown in FIG. 7, the two-dimensional code (a), the two-dimensional code (b), and the two-dimensional code (d) all use a design solution in which long elongated regions and short elongated regions are arranged in a staggered manner, and an encoding region of the two-dimensional code (c) uses a design solution in which only long elongated regions are reserved.

Figure 8:
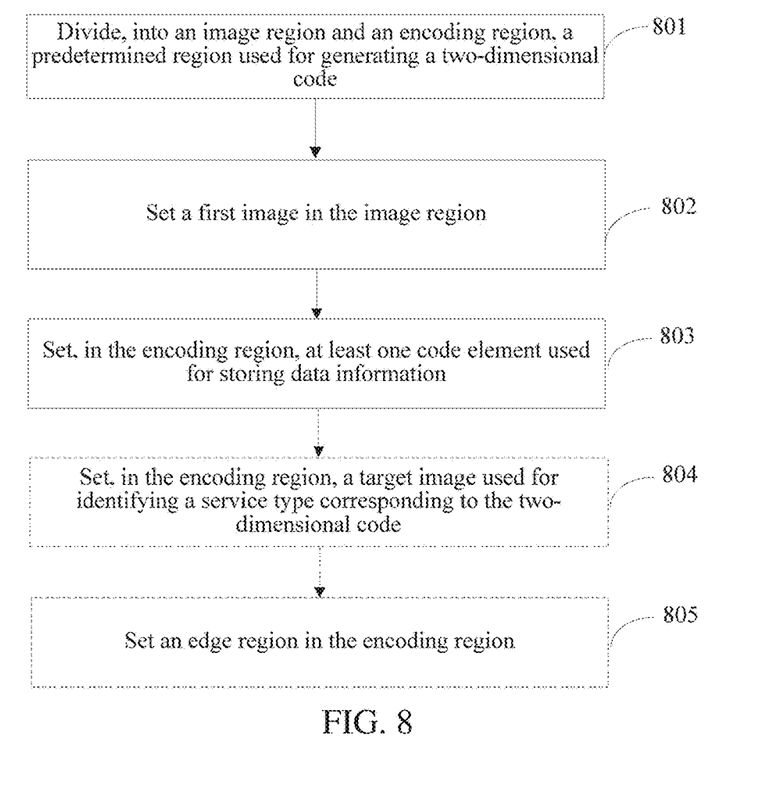
FIG. 8 is a schematic flowchart of an information processing method according to an embodiment.

FIG. 8 is a schematic flowchart of an information processing method according to an embodiment. As shown in FIG. 8, the following steps are included:

Step 801. Divide, into an image region and an encoding region, a predetermined region used for generating a two-dimensional code, the encoding region and the image region not overlapping with each other.

For example, the entire circular region shown in FIG. 4 is the predetermined region, where the image region 10 and the encoding region 20 do not overlap with each other.

Step 802. Set a first image in the image region.

Step 803. Set, in the encoding region, at least one code element used for storing data information.

In this embodiment of this application, the code element is used as a fundamental unit of the two-dimensional code, and the data information that can be stored includes specification information, a codeword, boundary information, and the like.

In one embodiment, code elements of the two-dimensional code are aggregated to obtain at least two elongated regions, and the image region is located in a middle part of a connection line between the at least two elongated regions; and the at least two elongated regions are radially arranged around the image region.

For a specific method, refer to the embodiment given in FIG. 4. Details are not described herein again.

In one embodiment, the at least two elongated regions are uniformly arranged around the image region.

In one embodiment, the at least two elongated regions include elongated regions having a first length and elongated regions having a second length that are arranged in a staggered manner, where the first length is greater than the second length.

In one embodiment, the image region is a circular region or a rectangular region.

In another embodiment, the method further includes:

Step 804. Set, in the encoding region, a target image used for identifying a service type corresponding to the two-dimensional code.

A region in which the target image is located includes a target vertex used for aligning the two-dimensional code. A contour of the target image is a circular contour, and the target vertex is a center point of the circular contour. For a specific method, refer to the method for setting the target image 25 in FIG. 4. Details are not described herein again.

In one embodiment, the first image is an avatar of a user of the two-dimensional code or a logo.

In still another embodiment, the method further includes:

Step 805. Set an edge region in the encoding region, code elements in the edge region forming a circular visible pattern. For a specific method, refer to the method for setting the target image 23 in FIG. 4. Details are not described herein again.

Figure 9:
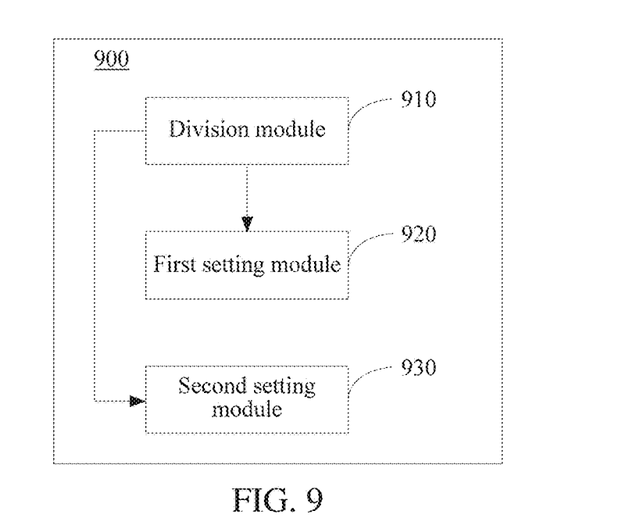
FIG. 9 is a schematic structural diagram of an information processing device according to an embodiment.

FIG. 9 is a schematic structural diagram of an information processing device according to an embodiment. As shown in FIG. 9, the information processing device 900 includes:

a division module 910, configured to divide, into an image region and an encoding region, a predetermined region used for generating a two-dimensional code, the encoding region and the image region not overlapping with each other;

a first setting module 920, configured to set a first image in the image region divided by the division module 910; and a second setting module 930, configured to set, in the encoding region divided by the division module 910, at least one code element used for storing data information.

In one embodiment, the second setting module 930 is further configured to set, in the encoding region, a target image used for identifying a service type corresponding to the two-dimensional code.

In one embodiment, the second setting module 930 is further configured to set an edge region in the encoding region, code elements in the edge region forming a circular visible pattern.

Figure 10:
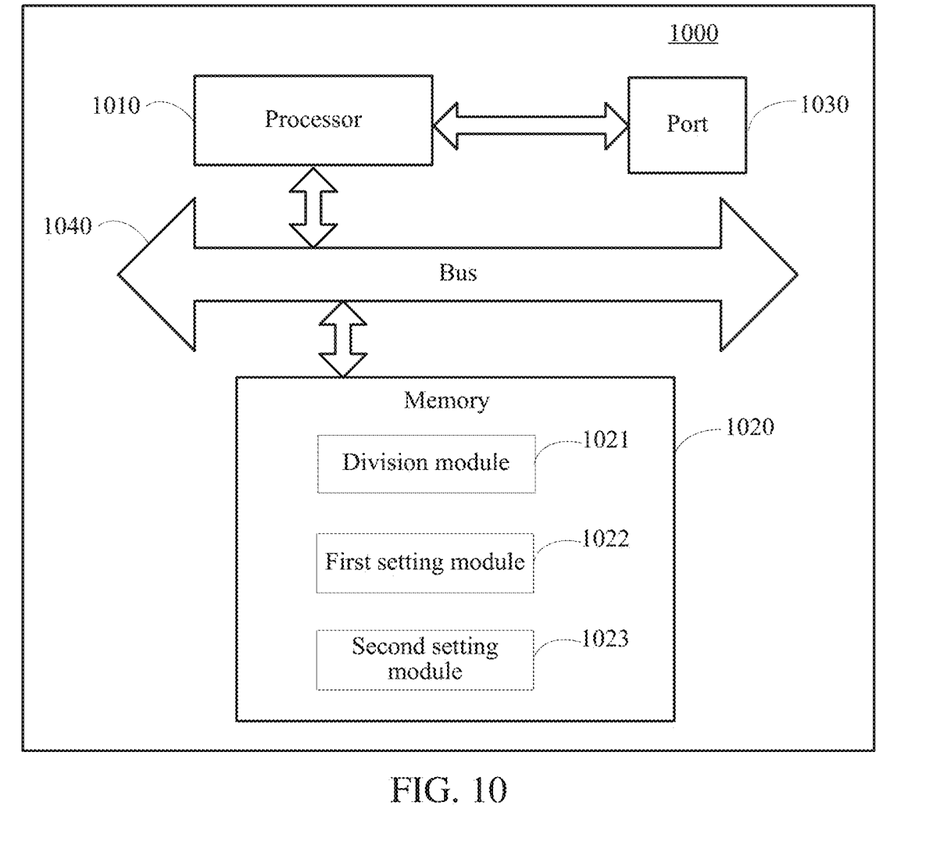
FIG. 10 is a schematic structural diagram of an information processing device according to another embodiment.

FIG. 10 is a schematic structural diagram of an information processing device according to another embodiment. As shown in FIG. 10, the information processing device 1000 may include: a processor 1010, a memory 1020, a port 1030, and a bus 1040. The processor 1010 and the memory 1020 are interconnected by using the bus 1040. The processor 1010 may receive and send data through the port 1030.

The processor 1010 is configured to execute a machine readable instruction module stored in the memory 1020.

The memory 1020 stores a machine readable instruction module executable by the processor 1010. The instruction module executable by the processor 1010 may include: a division module 1021, a first setting module 1022, and a second setting module 1023, where when executed by the processor 1010, the division module 1021 may be configured to: divide, into an image region and an encoding region, a predetermined region used for generating a two-dimensional code, the encoding region and the image region not overlapping with each other;

when executed by the processor 1010, the first setting module 1022 may be configured to: set a first mage in the image region divided by the division module 1021; and when executed by the processor 1010, the second setting module 1023 may be configured to: set, in the encoding region divided by the division module 1021, at least one code element used for storing data information.

In one embodiment, when executed by the processor 1010, the second setting module 1023 may be further configured to: set, in the encoding region, a target image used for identifying a service type corresponding to the two-dimensional code.

In one embodiment, when executed by the processor 1010, the second setting module 1023 may be further configured to: set an edge region in the encoding region, code elements in the edge region forming a circular visible pattern.

It can be learned from that, when executed by the processor 1010, the instruction module stored in the memory 1020 may implement various functions of the division module, the first setting module, and the second setting module in the foregoing embodiments.

An embodiment further provides a print generation device, and the print generation device prints a two-dimensional code described in the foregoing on a print.

For example, a two-dimensional code of an electronic version may be produced on a terminal (such as a mobile phone or a computer), then an avatar of a user or a logo is added to the image region in the two-dimensional code of the electronic version by using Photoshop (PS) software, to obtain a to-be-printed two-dimensional code, and then the to-be-printed two-dimensional code is printed to form a print.

A print material and a printing technology are not specifically limited in this embodiment. For description, the print material may be one or more of paper, plastic, and metal. For the print, one or more of mimeographing, letterpress printing, hectographing, or the like in the printing technology may be used for printing.

The two-dimensional code provided in this embodiment has a radial structure formed by the plurality of elongated regions, and there is a blank region between elongated regions. After the two-dimensional code is printed to a print, a user may print or add another pattern or text between elongated regions according to actual requirements, and this is not specifically limited in this embodiment.

It should be noted that when the two-dimensional code includes an image region, a first image in the image region may be integrally printed with the two-dimensional code, or may be separately printed and then pasted in the image region of the two-dimensional code. This is not specifically limited in this embodiment.

The foregoing descriptions are only specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by at least one processor of an information processing device, and the method comprising:
    dividing, by the at least one processor, a predetermined region used for generating a two-dimensional code into an image region and an encoding region that does not overlap the image region;
    setting, by the at least one processor, a first image in the image region;
    setting, by the at least one processor, at least one code element used for storing data information in the encoding region;
    aggregating, by the at least one processor, code elements of the two-dimensional code to obtain at least two elongated regions, wherein the image region is located between the at least two elongated regions; and
    radially arranging, by the at least one processor, the at least two elongated regions around the image region.

2. The method according to claim 1, wherein the at least two elongated regions are uniformly arranged around the image region.

3. The method according to claim 1, wherein the at least two elongated regions comprise a first elongated region of a first length and a second elongated region of a second length, wherein the first elongated region and the second elongated region are arranged in a staggered manner, and wherein the first length is greater than the second length.

4. The method according to claim 1, wherein the image region is a circular region or a rectangular region.

5. The method according to claim 1, further comprising setting, by the at least one processor, a target image used indicating a service type corresponding to the two-dimensional code in the encoding region.

6. The method according to claim 5, wherein a target vertex used for aligning the two-dimensional code is provided proximate the target image.

7. The method according to claim 6, wherein a contour of the target image is a circular contour, and
    wherein the target vertex is disposed at a center of the circular contour.

8. The method according to claim 1, further comprising setting, by the at least one processor, an edge region in the encoding region,
    wherein code elements in the edge region form a circular pattern.

9. The method according to claim 1, wherein the first image comprises an avatar of a user of the two-dimensional code or a logo.

10. The method according to claim 1, wherein the at least two elongated regions comprise n elongated regions,
wherein the n elongated regions are radially arranged around the image region at intervals of 360/n degrees, and
wherein n is an integer greater than 1.

11. A device comprising:
at least one memory configured to store computer program code; and
at least one processor configured to access the at least one memory and operate as instructed by the computer program code, the computer program code comprising:
dividing code configured to cause the at least one processor to divide a predetermined region used for generating a two-dimensional code into an image region and an encoding region that does not overlap the image region;
first setting code configured to cause the at least one processor to set a first image in the image region;
second setting code configured to cause the at least one processor to set at least one code element used for storing data information in the encoding region;
aggregating code configured to cause the at least one processor to aggregate code elements of the two-dimensional code to obtain at least two elongated regions, wherein the image region is located between the at least two elongated regions; and
arrangement code configured to cause the at least one processor to radially arrange the at least two elongated regions around the image region.

12. The device according to claim 11, wherein the second setting code is further configured to cause the at least one processor to set a target image used indicating a service type corresponding to the two-dimensional code in the encoding region.

13. The device according to claim 11, wherein the second setting code is further configured to cause the at least one processor to set an edge region in the encoding region, wherein code elements in the edge region form a circular visible pattern.

14. The device according to claim 11, wherein the at least two elongated regions comprise n elongated regions,
wherein the n elongated regions are radially arranged around the image region at intervals of 360/n degrees, and
wherein n is an integer greater than 1.

15. One or more non-transitory computer readable storage medium storing computer readable instructions, the computer readable instructions, when executed by one or more processors of a device, cause the device to:
divide a predetermined region used for generating a two-dimensional code into an image region and an encoding region that does not overlap the image region;
set a first image in the image region;
set at least one code element used for storing data information in the encoding region;
aggregate code elements of the two-dimensional code to obtain at least two elongated regions, wherein the image region is located between the at least two elongated regions; and
radially arrange the at least two elongated regions around the image region.

16. The one or more non-transitory computer readable storage medium according to claim 15, wherein the at least two elongated regions are uniformly arranged around the image region.

17. The one or more non-transitory computer readable storage medium according to claim 15, wherein the at least two elongated regions comprise a first elongated region of a first length and a second elongated region of a second length,
wherein the first elongated region and the second elongated region are arranged in a staggered manner, and
wherein the first length is greater than the second length.

18. The one or more non-transitory computer readable storage medium according to claim 15, wherein the image region is a circular region or a rectangular region.

19. The one or more non-transitory computer readable storage medium according to claim 15, wherein the computer readable instructions further cause the one or more processors to set a target image used indicating a service type corresponding to the two-dimensional code in the encoding region.

20. The one or more non-transitory computer readable storage medium according to claim 15, wherein the at least two elongated regions comprise n elongated regions,
wherein the n elongated regions are radially arranged around the image region at intervals of 360/n degrees, and
wherein n is an integer greater than 1.

* * * * *